(12) United States Patent
Crill

(10) Patent No.: US 8,327,935 B2
(45) Date of Patent: Dec. 11, 2012

(54) METHODS OF USE OF A SALT SOLUTION OF MONOVALENT AND DIVALENT CATIONS IN HYDRAULIC FRACTURING

(76) Inventor: Dick Crill, Snyder, TX (US)

( * ) Notice: Subject to any disclaimer, the term of this patent is extended or adjusted under 35 U.S.C. 154(b) by 208 days.

(21) Appl. No.: 12/640,562

(22) Filed: Dec. 17, 2009

(65) Prior Publication Data

US 2011/0146980 A1  Jun. 23, 2011

(51) Int. Cl.
*E21B 43/26* (2006.01)
(52) U.S. Cl. ...................................................... 166/271
(58) Field of Classification Search ............... 166/305.1, 166/308.1, 308.2, 308.3, 271
See application file for complete search history.

(56) References Cited

U.S. PATENT DOCUMENTS

| | | | | |
|---|---|---|---|---|
| 4,321,968 A * | 3/1982 | Clear | .......................... | 166/275 |
| 4,714,113 A * | 12/1987 | Mohnot et al. | ................ | 166/270 |
| 5,452,764 A * | 9/1995 | Jennings, Jr. | ................ | 166/291 |
| 5,875,843 A * | 3/1999 | Hill | .......................... | 166/250.1 |
| 6,100,222 A * | 8/2000 | Vollmer et al. | ................ | 507/113 |
| 7,021,377 B2 * | 4/2006 | Todd et al. | ..................... | 166/278 |
| 7,374,371 B2 | 5/2008 | Crill | | |
| 7,387,985 B2 * | 6/2008 | Kippie et al. | ................. | 507/212 |
| 7,497,263 B2 * | 3/2009 | Parris et al. | ................ | 166/308.5 |
| 7,956,012 B2 * | 6/2011 | Gupta et al. | .................. | 507/120 |
| 8,030,254 B2 * | 10/2011 | Phatak et al. | ................. | 507/277 |
| 2006/0270563 A1 * | 11/2006 | Yang et al. | .................... | 507/119 |
| 2007/0114035 A1 * | 5/2007 | Parris et al. | ................... | 166/300 |

* cited by examiner

*Primary Examiner* — Angela M. DiTrani
*Assistant Examiner* — Silvana Runyan
(74) *Attorney, Agent, or Firm* — Leydig, Voit & Mayer, Ltd.

(57) ABSTRACT

A method for fracturing a subterranean formation penetrated by a well bore comprises formulating a fracturing fluid useful in hydrocarbon drilling having the properties of both a dispersing fracture solution and an aggregating fracture solution. In particular, the dispersing properties of the stabilizing fracture solution are able to act as a dispersing fracture fluid in the clay and earthen materials discharged from the pay zone in the flow-back fluids during hydraulic fracturing. At the same time, aggregating properties of the stabilizing solution stabilize the pay zone. This stabilization property allows the flow of hydrocarbon through the fractures for a significantly longer time than with prior art fluids.

6 Claims, No Drawings

METHODS OF USE OF A SALT SOLUTION OF MONOVALENT AND DIVALENT CATIONS IN HYDRAULIC FRACTURING

FIELD OF THE INVENTION

The present invention relates to production of hydrocarbons such as crude oil and natural gas from subterranean formations via wells drilled into the formation. Specifically, the invention relates to fracturing subterranean formations to stimulate production. More specifically, the invention relates to fracture fluid compositions and methods for using them.

BACKGROUND OF THE INVENTION

It has been known for decades that hydraulic fracture stimulation can improve the productivity of a well in a tight petroleum or gas reservoir, because a long conductive fracture transforms the flow path that petroleum or natural gas must take to enter the wellbore. It is also known that the fractures created close back shut over time and the well stops producing. How long a well produces depends on the composition of the oil bearing formation and the type of fracture fluid used. Oil wells which become non-producing can often be re-fractured and become producing wells again. As much as 70 percent of the oil is often still in the ground when a well becomes non-producing.

It is common practice to stimulate recovery of fluids from subterranean porous formations by fracturing the porous formation to open new pathways for flow to the wellbore. One commonly used technique for fracturing formations is hydrofracturing. In such fracturing operations, a fracturing fluid (or "frac fluid") is hydraulically injected into a wellbore penetrating the subterranean formation and is forced against the formation strata by very high pressure. The formation strata or rock is forced to crack and fracture, and a proppant is placed in the fracture by movement of a viscous-fluid containing proppant into the crack in the rock. The resulting fracture, with proppant in place, provides improved flow of the recoverable fluid, i.e., oil, gas or water, into the wellbore.

Fracturing fluids customarily comprise a thickened or gelled aqueous solution which has suspended therein "proppant" particles that are substantially insoluble in the fluids of the formation. Proppant particles carried by the fracturing fluid remain in the fracture created, thus propping open the fracture when the fracturing pressure is released and the well is put into production. Suitable proppant materials include sand, walnut shells, sintered bauxite, or similar materials. The "propped" fracture provides a larger flow channel to the wellbore through which an increased quantity of hydrocarbons can flow, thereby increasing the production rate of a well.

Dispersing fracture fluids are those which include aqueous solutions of monovalent cation salts, such as potassium chloride (KCl) and sodium chloride (NaCl), ammonium chloride ($NH_4Cl$) and other salts. For example, dispersing fracture fluids may include alkoxylated fatty amines and an alkoxylated quaternary ammonium salt organic sulfates, phosphates, chlorides, fluorides, citrates, acetates, tartrates, hydrogenphosphates or a mixture thereof. Other examples include ammonium sulfate, sodium sulfate, magnesium sulfate, aluminum sulfate, ammonium hydrogen phosphate, sodium hydrogen phosphate, and potassium hydrogen phosphate.

Aggregating fracture fluids are those which include aqueous solutions of di and trivalent cation salts, including calcium chloride ($CaCl_2$), ferric chloride ($FeCl_3$), magnesium chloride ($MgCl_2$), and other salts, for example, such as di, and trivalent metal salts of carboxylic acids. Exemplary salts can also include ferric oxalate, ferric ammonium citrate, barium acetate, aluminum lactate, and magnesium formate.

A dispersing fracture solution in the fracture zone will disperse clays and other earthen particles and allow them to be carried by the flow-back fluids out of the hydrocarbon producing fracture zone. This process increases hydrocarbon production when the pay zone is not mostly clay.

In contrast, an aggregating fracture solution, such as $CaCl_2$, will aggregate and bind clays and other earthen materials. This stabilizes the fracture zone but will eventually clog and occlude the pay zone with the clay particles that are not aggregated by the $CaCl_2$.

The fracturing operation is intended to create fractures that extend from the wellbore into the target oil or gas formations. Injected fluids have been known to travel as far as 3,000 feet from the well. Although attempts are made to design fracturing jobs to create an optimum network of fractures in an oil or gas formation, fracture growth is often extremely complex, unpredictable and uncontrollable. Computer models are used to simulate fracture pathways, but the few experiments in which fractures have been exposed through coring or mining have shown that hydraulic fractures can behave much differently than predicted by models.

Many fracturing fluid materials, therefore, when used in large concentrations, have relatively poor "clean-up" properties, meaning that such fluids undesirably reduce the permeability of the formation and proppant pack after fracturing the formation. Detailed studies of polysaccharide recovery in the field after hydraulic fracturing operations indicate that more than sixty percent of the total mass of polysaccharide pumped during the treatment maybe left in the fracture at the time gas or oil begins to be produced in commercial quantities.

In general, a single fracturing operation in a shallow gas well (such as a coalbed methane well) may use several hundreds of thousands of gallons of water. Slickwater fracs, which are commonly used in shale gas formations, have been known to use up to five million gallons of water to fracture on one horizontal well.

In most cases, fresh water is used to fracture wells because it is more effective than using wastewater from other wells. If wastewater is used, the water must be heavily treated with chemicals to kill bacteria that cause corrosion, scaling and other problems. Even freshwater fracturing operations, however, contain numerous chemicals such as biocides, acids, scale inhibitors, friction reducers, surfactants and others, but the names and volumes of the chemicals used on a specific fracturing job are almost never fully disclosed. In general, it is known that many fracturing fluid chemicals are toxic to human and wildlife, and some are known to cause cancer or are endocrine disruptors.

There continues to exist in the well drilling and hydraulic fracturing arts, a need for a fracture fluid that is effective in a variety of soil conditions, and has properties of both an aggregating fluid and a dispersing fluid, but is also non-toxic and not a source of hazardous waste.

BRIEF SUMMARY OF THE INVENTION

The fracture fluid of the present invention provides the properties of both a dispersing fracture solution and an aggregating fracture solution.

In particular, it was surprisingly found that a solution that was originally developed and used for creating hardpans and stabilizing roadways was useful as a fracture fluid in well drilling.

It was also surprisingly found that the dispersing properties of the stabilizing solution are able to act as a dispersing fracture fluid in the clay and earthen materials discharged from the pay zone, in the flow-back fluids during drilling. At the same time, aggregating properties of the stabilizing solution also stabilizes the pay zone and allows hydrocarbons to be released. This stabilization property allows the flow of hydrocarbon through the fractures for a significantly longer time than with prior art fluids.

In an embodiment, the present invention provides a method of fracturing a subterranean formation penetrated by a well bore, comprising formulating a fracturing fluid comprising a brine solution having a mixture of monovalent and divalent cations, and pumping the fracturing fluid down the wellbore at a rate and pressure sufficient to initiate or extend a fracture in the formation. In addition, in another embodiment, the method of the present invention wherein the brine solution used in the method comprises: a deliquescent mixture of salts of monovalent and divalent cations; a sufficient amount of surfactant; and water. It is also understood that the brine fracture fluid used in the method of the present invention can also comprise one or more additives.

In another embodiment, the present invention provides a method of fracturing a subterranean formation penetrated by a well bore, comprising: obtaining a first fracturing fluid comprising a brine solution having a mixture of monovalent cations; pumping the first fracturing fluid down the wellbore at a rate and pressure sufficient to initiate or extend a fracture in the formation; obtaining a second fracturing fluid comprising a brine solution having a mixture of monovalent and divalent cations; and pumping the second fracturing fluid down the wellbore at a rate and pressure sufficient to initiate or extend a fracture in the formation.

DETAILED DESCRIPTION OF THE INVENTION

The present invention provides a novel method of use of an earthen stabilizing solution as a hydraulic fracture fluid suitable for use in well drilling, having the properties of both a dispersing fracture solution, and an aggregating fracture solution.

The composition of the fracture solution useful in the methods of the present invention is based on the brine sealant salt solution disclosed in U.S. Pat. No. 7,374,371 to Crill, and incorporated by reference in its entirety, as if set forth herein.

The fracture formation method of the present invention begins with formulation of a fracturing fluid comprising a brine solution having a mixture of monovalent and divalent cations, and subsequently pumping the fracturing fluid down the wellbore at a rate and pressure sufficient to initiate or extend a fracture in the formation. This method causes a dispersion of clay particles with mixtures of monovalent and divalent cations in a deliquescent brine solution. These cations include sodium, potassium, magnesium and calcium and similar ions. The deliquescent brine solution has a density greater than water, and a sufficient monovalent and divalent cation concentration to allow the clay molecules to separate into individual molecules and disperse into solution.

The solution of dispersed clay molecules thus formed has the beneficial property of being able to flow out of the fractures created by the fracturing process.

Clays generally comprise mixtures of aluminum and iron silicates. These silicates are negatively charged in solution. It is known that when positively charged monovalent ions are added to a suspension of clays, such as the addition of $Na^+$ or $K^+$, the positive charged ions counter the negatively charged clays allowing the molecules of clay to become more water soluble and disperse into solution. The dispersed clay in concentrated brine water allows the clay molecules to separate into individual molecules.

Having the clay molecules dissolved in a high density brine solution allows these dispersed and suspended clay molecules to be dissolved in the fracture fluid of the present invention and flow out of the fractures in the pay zone. While not wanting to be bound by a specific technical theory, it is thought that in the capillary, the aqueous solution of mono and divalent ions can pass through the fractures created by the high pressure in the rock strata.

It has also been surprisingly found that the use of brine solutions having a mixture of monovalent and divalent cations with clay that are deliquescent can achieve permanent opening and stabilization of the fractures in the pay zone.

An embodiment of the composition of brine solution used for a fracture fluid of the present invention is presented in Table 1. The percentages of salts are by weight with the remainder being water.

TABLE 1

| Mineral Content | Range of Percentage by weight |
| --- | --- |
| Chloride | 20-25 |
| Bromide | 0.3-0.55 |
| Magnesium | 3.0-5.0 |
| Calcium | 0.6-0.8 |
| Sodium | 5.0-7.0 |
| Potassium | 0.2-0.4 |
| Manganese | 0.01-0.03 |
| Total salts | 3.0-35.0 |
| Water | (remainder) |

The carrier or fracturing fluid used in the hydraulic fracturing method of the present invention may further contain one or more conventional additives known to the well service industry such as a gelling agent, crosslinking agent, gel breaker, surfactant, biocide, surface tension reducing agent, foaming agent, defoaming agent, demulsifier, non-emulsifier, scale inhibitor, gas hydrate inhibitor, polymer specific enzyme breaker, oxidative breaker, buffer, clay stabilizer, acid, buffer, solvent or a mixture thereof and other well treatment additives known in the art. The addition of such additives to the carrier fluids minimizes the need for additional pumps required to add such materials on the fly.

In an embodiment of the method of hydraulic fracture of the present invention, the brine solution having a mixture of monovalent and divalent cations may also be used with a proppant. The proppant, or particulates, are suspended in the brine solution having a mixture of monovalent and divalent cations, and introduced into the subterranean formation at a pressure above a fracturing pressure of the subterranean formation. In this method, at least a portion of the particulate material is substantially neutrally buoyant in the carrier fluid. Further, the substantially neutrally buoyant proppant or particulate is used in a sand control method for a wellbore penetrating a subterranean formation and may be introduced into the wellbore in a slurry with the brine solution having a mixture of monovalent and divalent cations. In this method at least a portion of the individual particles of the particulate material may be substantially neutrally buoyant in the brine solution.

Conventional propped hydraulic fracturing methods, with appropriate adjustments if necessary, as will be apparent to those skilled in the art, are used in the methods of the present invention. In one embodiment, the fracture stimulation treatment according to the present invention typically begins with a conventional pad stage to generate the fracture, followed by a sequence of stages in which a viscous carrier fluid transports proppant into the fracture as the fracture is propagated. Typically, in this sequence of stages the amount of propping agent is increased, normally stepwise. The pad and carrier fluid can be, and usually are, a gelled aqueous fluid, such as the brine solution having a mixture of monovalent and divalent cations as shown in Table 1, thickened with a viscoelastic surfactant or with a water soluble or dispersible polymer such as guar, hydroxypropylguar or the like. The pad and carrier fluids may contain various additives. Non-limiting examples are fluid loss additives, crosslinking agents, clay control agents, and mobility control agents such as fibers, breakers and the like, provided that the additives do not affect the stability or action of the formation-dissolving fluid.

Other examples of additives that can be used with the fracture fluid in the method of the present invention include silicone based fluids including dimethylsiloxane polymers, also called dimethyl silicone fluids. Examples include silicone fluid L-530, and L-531 (Union Carbide Corp., 39 Old Ridgebury Rd., Danbury, Conn. 06817), WACKER® AK 50 SILICONE FLUID (Wacker Chemie AG Hanns-Seidel-Platz 4, 81737 München, Germany), and similar fluids. The silicone drilling fluids are functionally capable of carrying out additional wellbore functions such as those performed by a spotting fluid, packer-fluid, completion fluid, workover fluid and coring fluid. Emulsifers, demulsifiers, surfactants, wetting agents, pH adjusting agents, iron control agents, acids antibacterial agents, corrosion inhibitors, and other auxiliary substances known to those of ordinary skill in the art.

The procedural techniques for pumping fracture stimulation fluids down a wellbore to fracture a subterranean formation are well known in the art. The person that designs such fracturing treatments is the person of ordinary skill to whom this disclosure is directed. That person has available many useful tools to help design and implement the fracturing treatments, one of which is a computer program commonly referred to as a fracture simulation model (also known as fracture models, fracture simulators, and fracture placement models). Most, if not all, commercial service companies that provide fracturing services to the oilfield have one, or more, fracture simulation models that their treatment designers use. One commercial fracture simulation model that is widely used by several service companies is known as FRACCADE software. This commercial computer program is a fracture design, prediction, and treatment-monitoring program designed by Schlumberger, Ltd. All of the various fracture simulation models use information available to the treatment designer concerning the formation to be treated and the various treatment fluids (and additives) in the calculations, and the program output is a pumping schedule that is used to pump the fracture stimulation fluids into the wellbore.

In an embodiment, the initial fluid pumped to create the initial fracture geometry is a brine solution having a mixture of monovalent and divalent cations, followed by a proppant-transporting carrier fluid in the later stages. In an embodiment, the proppant-transporting carrier fluid being a conventional polymer-viscosified aqueous fluid. In another embodiment, the proppant-transporting carrier can be a polymer-viscosified aqueous brine solution of the present invention. Each is injected at pressures and rates sufficient to generate and propagate fractures. By non-limiting example the viscous formation dissolving fluid in the initial stage may be a brine solution as described in Table 1. The viscosity of such a system depends upon such factors as the surfactant concentration, the environment (such as the pH and the nature and concentration of salts), the time, the temperature, and the presence of other components such as alcohols, co-surfactants and breakers. The reactivity of such a system depends upon some of the same factors as well as on the nature and concentration of the formation-dissolving component. The nature of these dependencies are known, and thus the relative rates at which this carrier fluid loses viscosity, leakoff into the faces of the fracture and reacts with the formation are adjusted, and taking into account the flow rate necessary to maintain the needed pressure to maintain the hydraulic fracture open.

The brine solution of the present invention is pumped into the wellbore and so into the formation of interest at a pressure that exceeds the fracture initiation pressure of the formation. Once the required volume of brine solution has been injected into the formation, the pumps are shut down and the hydraulic fracture allowed close. Next, the hydraulic fracture has closed (BHP fallen below closure pressure) the well is produced to flow back the spent treating fluids.

The density of the brine fracture fluid used in the method of the present invention is typically between about 10 to about 11 pounds per gallon of solution, preferably between about 10.1 to about 10.2 pounds per gallon of solution, and most preferably about 10.18 pounds per gallon of solution.

The composition of the brine fracture fluid is preferably a mixture of magnesium and calcium chloride in a ratio of about 5 to 1 magnesium chloride to calcium chloride. The composition also must have sufficient sodium chloride or potassium chloride to suspend the clay and disperse it in solution. Most importantly, the brine fracture fluid must be deliquescent. That is, the composition will draw moisture out of the air continuously until it attains a liquid state. Examples of deliquescent salts are calcium chloride, magnesium chloride, potassium carbonate, trichloroacetic acid, calcium phosphate, nickel(II) chloride, potassium hydroxide, calcium nitrate, and sodium cyanide.

In one embodiment, a particular composition of the brine solution used in hydraulic fracture is shown in Table 2. It is understood by those of skill in the art that the brine solution shown in Table 2 can be combined with one or more additives commonly used in the art and discussed previously.

TABLE 2

| Mineral Content | Percentage by weight |
|---|---|
| Chloride | 22.27 |
| Bromide | 0.45 |
| Magnesium | 3.94 |
| Calcium | 0.76 |
| Sodium | 6.38 |
| Potassium | 0.30 |
| Manganese | 0.02 |
| Total salts | 34.12 |
| Water | 65.88 (remainder) |

In another embodiment of the present invention, the brine fracture fluid can be used in a two step process where the first step comprises using a brine fracture fluid that contains only monovalent cations such as sodium or potassium, to disperse the clay. In the second step, a brine fracture fluid such as the one described in Table 2, having both monovalent and divalent cations, is then added to fracture zone. The fracture fluid of the second step may also include one or more additives.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of fracturing a subterranean formation penetrated by a well bore, comprising:
   a) pumping a first brine solution down the wellbore at a rate and pressure sufficient to initiate or extend a fracture in the formation, wherein the first brine solution consists of water and a mixture of monovalent cations; and
   b) pumping a second brine solution down the wellbore at a rate and pressure sufficient to initiate or extend a fracture in the formation, wherein the second brine solution comprises a mixture of monovalent and divalent cations, and wherein a) is performed before b).

2. The method of claim 1, wherein the first brine solution consists of the following mineral composition by weight percent:
   chloride, 20-25; bromide, 0.3-0.55; sodium, 5.0-7.0; potassium, 0.2-0.4; per gallon of solution.

3. The method of claim 1, wherein the second brine solution comprises the following mineral composition by weight percent:
   chloride, 20-25; bromide, 0.3-0.55; magnesium, 3.0-5.0; calcium, 0.6-0.8; sodium, 5.0-7.0; potassium, 0.2-0.4; manganese, 0.01-0.03; per gallon of solution.

4. The method of claim 1, wherein the second brine solution contains a surfactant.

5. The method of claim 4, wherein the surfactant is a silicone based fluid.

6. The method of claim 4, wherein the second brine solution further comprises one or more additives.

* * * * *